United States Patent Office 3,423,826
Patented Jan. 28, 1969

3,423,826
MOUNTING FOR TWO RECIPROCABLE LOWER CUTTING ELEMENTS AND THE CUTTER FOIL OF A CUTTER HEAD FOR A DRY SHAVER
Erich Liska, Post Hitzendorf, Styria, Austria, assignor to Payer-Lux Eduard Payer
Filed Aug. 7, 1967, Ser. No. 658,823
Claims priority, application Austria, Aug. 5, 1966,
A 7,510/66
U.S. Cl. 30—43.92          7 Claims
Int. Cl. B26b 19/04

ABSTRACT OF THE DISCLOSURE

A cutter head for dry shavers in which two reciprocable lower cutting blades in contact with a stationary perforated cutter foil are mounted on a slide displaceably supported on a support frame which is releasably connected to a cutter head housing having a central web and lateral walls. The cutter foil is retained rigidly on the central web and movably on the lateral walls.

---

The invention relates to a cutter head for dry-shaving apparatus of the known type provided with a perforated cutter foil retained in the cutter head housing and a reciprocated lower cutting blade which is pressed against the cutter foil and which is supported, via at least one resilient member, on a support frame or the like connected releasably with the cutter head housing.

An increase in the cutting capacity of such cutter heads is achieved according to the invention in that the cutter head is designed as a double cutter head and has two lower cutting blades which are arranged substantially parallel to each other and are resiliently suspended to be movable independently of each other relative to the cutter head housing, there being associated with each lower cutting blade a cutter foil or a cutter foil sector which are movable independently of each other on the cutter head housing.

In a preferred embodiment of the invention, the cutter foils or the cutter foil sectors are rigidly retained on a central web of the cutter head housing and movably retained on the lateral walls of the cutter head housing, in particular by means of slots. Advantageously, the lower cutting blades are mounted to be tiltable independently of each other on a slide.

Figure 1:
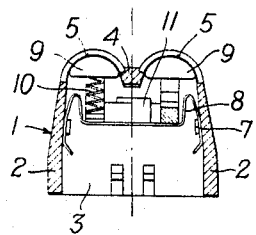
Figure 2:
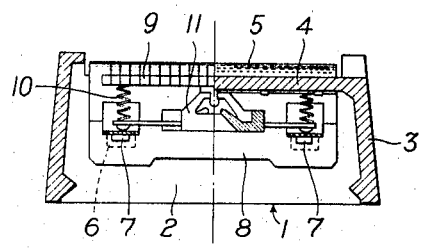
Figure 4:
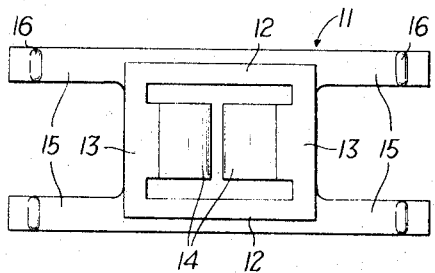
Figure 3:
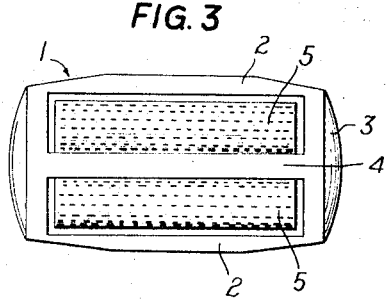
Figure 5:
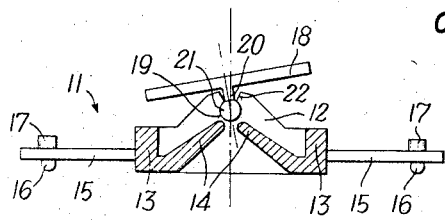
Figure 6:
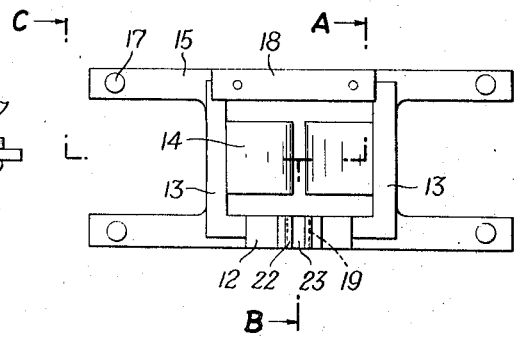
Figure 7:
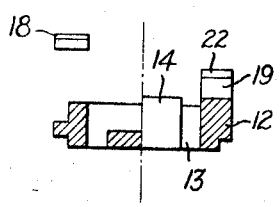
Figure 8:
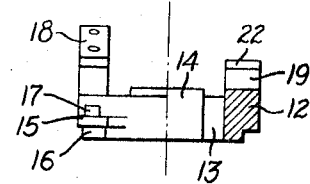
Figure 9:
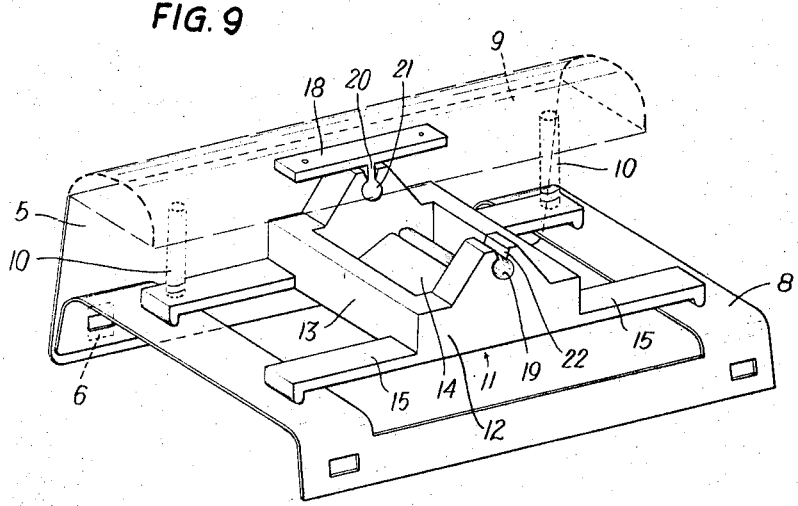

The invention and also advantageous developments thereof are discussed in the following text with reference to several embodiments, which are shown in the drawings. In the said drawings: FIGURE 1, FIGURE 2 and FIGURE 3 show a cross-section, a longitudinal section and a plan view of a first embodiment of a cutter head according to the invention, FIGURES 4, 5 and 6 show a view from underneath, a longitudinal section and a plan view of a structural part of the said cutter head, FIGURE 7 is a section taken along the line AB of FIGURE 6, FIGURE 8 is a section along the line BC of FIGURE 6 and FIGURE 9 shows, in diagrammatic form, a further variant of the said structural part.

The cutter head shown in FIGURES 1 to 3 is designed as a double cutter head and has a housing 1 provided with two lateral walls 2, two transverse walls 3 and a central web 4. Retained for movement independently of each other on the said housing are two cutter foils 5. Each cutter foil 5 is rigidly secured on the central web 4 and displaceably secured to one of the lateral walls 2. For displaceable securing, it is a simple arrangement to form each cutter foil 5, in its portion adjacent the lateral wall 2, with two recesses 6 each of which surrounds with clearance a retaining nose or projection 7, the said noses being arranged on the lateral walls 2 and serving furthermore for retaining a support frame 8. Under each cutter foil 5 is a reciprocably movable lower cutting blade 9 which is acted on by means of rubber or helical springs 10 and is tiltably mounted on a slide 11. Both lower cutting blades 9 may have substantially semi-cylindrical cutting faces. If appropriate, it would also be possible to secure to the central web 4 a single cutter foil the two lateral sectors of which bear, similarly to the cutter foils 5, against the lower cutting blades 9 and are secured to the lateral walls 2 of the cutter head housing 1.

A preferred embodiment of the slide 11 is discussed in the following text with reference to FIGURES 4 to 8. The slide 11 has two lateral walls 12 connected at their ends by transverse walls 13. The latter are provided at their inner sides which face each other with projections 14 between which a driving means for driving the lower cutting blades engages as soon as the cutter head has been fitted on the portion of the dry-shaving apparatus receiving the driving members. The slide 11 has four support arms 15 which extend in pairs substantially from the transverse walls 13 and which are resilient. The support arms 15 are each preferably provided with a rounded sliding member 16 serving for displaceable supporting on the support frame 8. Each support arm 15 advantageously has, on its side facing the lower cutting blade 9, a retaining means 17, for example a pin, for one of the springs 10, the retaining means being preferably disposed opposite the slide member 16.

Tiltably mounted in each lateral wall 12 of the slide 11 is a support member 18 for one of the lower cutting blades 9. For this purpose, each lateral wall 12 is formed with a cylindrical recess 19 which is slotted on the cutting blade side, whereas the support 18 for the lower cutting blade 9 has a cylindrical hinge portion 21 arranged on a web 20 transversely of the direction of movement of the lower cutting blade. The tiltability of the web 20 and therewith also of the lower cutting blade 9 is limited by the sides 22 of the slot 23 of the recess 19.

The slide 11 is advantageously made from a resilient plastic material, in particular acetal resin, so that each lower cutting blade 9 and the cutter foil 5 bearing against it are able to yield perpendicularly to the direction of movement of the lower cutting blade and also to the tilting axis thereof, thus providing additional adaptation to the cutting path.

FIGURE 9 shows a similar design of the slide 11 wherein, however, the support arms 15 are not offset relatively to the outer faces of the lateral walls 12. A cutter foil 5 and a lower cutting blade 9 are indicated in this illustration, and also a variant of the support frame 8, which may be made from sheet steel.

I claim:

1. A cutter head for a dry-shaver comprising a cutter head housing, a support frame detachably connected to said housing, at least one perforated cutter foil mounted on said housing, a side on said support frame, two reciprocable lower cutting blades supported by said slide in substantially parallel arrangement, said cutter head housing including a central web and lateral walls, said foil being secured to said central web, at least one resilient member on said support frame supporting said cutting blades and urging the same against said cutter foil, and means supporting said lower cutting blades on said slide for tilting movement in the direction of reciprocation.

2. A cutter head as claimed in claim 1, wherein each said cutter foil has recesses, said lateral walls of said cutter head housing including noses which engage respective of said recesses with clearance, said support frame detachably engaging said noses to be secured to the housing.

3. A cutter head as claimed in claim 1, wherein said slide includes support arms displaceably supported on said support frame and two lateral walls, said means supporting the cutting blades on said slide comprising a support member on each of said lower cutting blades tiltably mounted in one of said lateral walls, said support frame including transverse walls connecting said lateral walls and including projections at their inner facing surfaces for engaging a driving member.

4. A cutter head as claimed in claim 3, wherein said support arms extend in pairs longitudinally from said transverse walls and are resilient.

5. A cutter head as claimed in claim 3, wherein said slide includes two support arms for each of said lower cutting blades, a resilient member being provided on each support arm such that each said lower cutting blade is resiliently supported on each of the said two support arms.

6. A cutter head as claimed in claim 5, wherein each support arm includes retaining means for a resilient member, and a sliding member, each support arm having a surface facing said lower cutting blade on which said retaining means is disposed, said retaining means being a pin for retaining a spring, said sliding member being on the surface of said support arm which is opposite that with the pin.

7. A cutter head as claimed in claim 5, wherein said lateral walls of the slide are each formed with a cylindrical recess which is slotted on the cutting blade side, each of said support members of said lower cutting blades including a cylindrical hinge part connected by a web to said support member, said cylindrical hinge part being arranged transversely of the direction of movement of said lower cutting blade on said web, the degree of movement of the blade being limited by the contact of the web with sides of said slot in said recess.

References Cited

UNITED STATES PATENTS

| | | | |
|---|---|---|---|
| 2,225,581 | 12/1940 | Berg | 30—43.2 |
| 2,272,123 | 2/1942 | Te Pas et al. | 30—43.2 |
| 2,526,153 | 10/1950 | Page | 30—43.91 |
| 2,867,737 | 1/1959 | Bylund | 30—43.92 X |
| 3,105,298 | 10/1963 | Carissimi | 30—43.92 |
| 3,144,714 | 8/1964 | Beisma | 30—43.92 |
| 3,213,535 | 10/1965 | Heyek | 30—34.1 |
| 3,233,323 | 2/1966 | Driessen | 30—43.2 |
| 3,339,278 | 9/1967 | Kleinman | 30—43 |

FOREIGN PATENTS

| | | |
|---|---|---|
| 625,817 | 7/1949 | Great Britain. |
| 784,909 | 10/1957 | Great Britain. |
| 624,933 | 9/1961 | Italy. |

MYRON C. KRUSE, *Primary Examiner.*